D. PERIBONIS.
HOLLOW METAL JAMB AND TRIM.
APPLICATION FILED APR. 2, 1917.
1,245,018.
Patented Oct. 30, 1917.
2 SHEETS—SHEET 1.
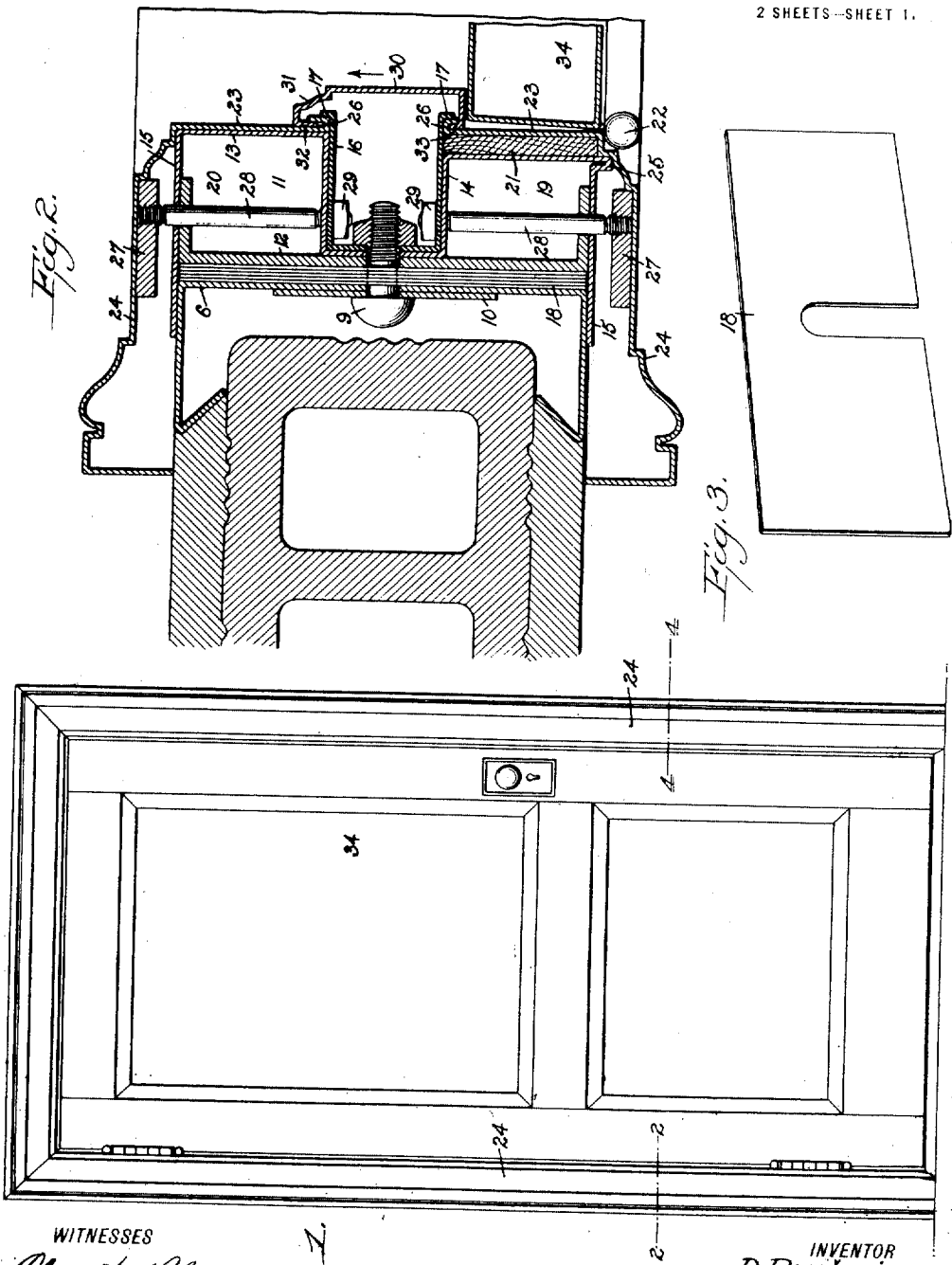

UNITED STATES PATENT OFFICE.

DANIEL PERIBONIS, OF NEW YORK, N. Y.

HOLLOW METAL JAMB AND TRIM.

1,245,018.  Specification of Letters Patent.  Patented Oct. 30, 1917.

Application filed April 2, 1917. Serial No. 159,107.

*To all whom it may concern:*

Be it known that I, DANIEL PERIBONIS, a citizen of the United States, and a resident of the city of New York, borough of Bronx, in the county of Bronx and State of New York, have invented a new and Improved Hollow Metal Jamb and Trim, of which the following is a full, clear, and exact description.

An object of the invention is to provide a hollow metal jamb and trim which is secured by means of concealed fasteners, no drilling or tapping to be done during the erection, and which does not utilize any screws for connecting the various parts constituting the jamb and trim.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a door jamb embodying my invention;

Fig. 2 is an enlarged horizontal cross section on line 2—2, Fig. 1;

Fig. 3 is a perspective view of a spacing washer;

Figure 4:
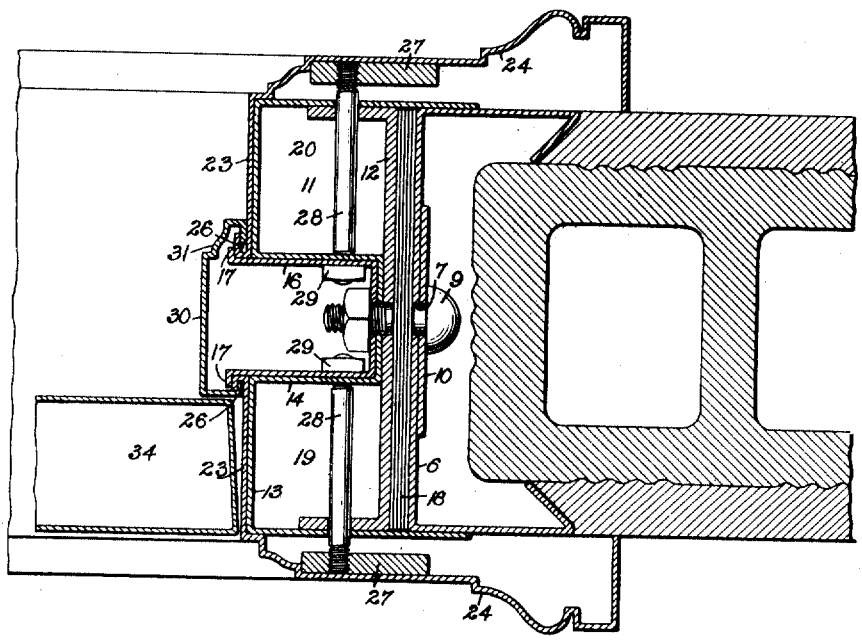
Fig. 4 is a horizontal section on line 4—4, Fig. 1.
Figure 5:
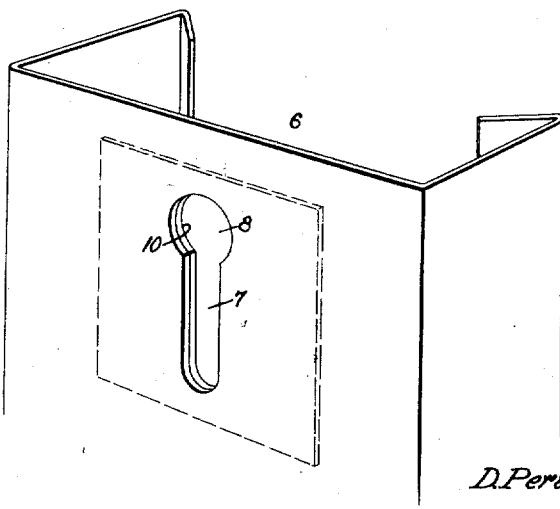
Fig. 5 is a fragmentary perspective view of the buck.

Referring to the drawings, 6 is the buck, which is shown of pressed steel, to which fasteners are to be applied. These fasteners may be used also on wooden bucks. When made of metal it has a plurality of elongated alining spaced slots 7 each terminating with an enlargement 8 at one end thereof through which the head of a bolt 9 may be inserted in the slot. The portion of the buck at the slot is reinforced by a plate 10 which is welded or otherwise secured on the inner surface of the buck.

The slots 7 permit the proper setting of the fastener 11 formed of three parts welded together. The part 12 is a U-shaped channel provided with suitable openings for the bolts 9. Part 13 has a central U-shaped channel 14 the bottom of which rests against the inner surface of the channel 12, said member 13 having the sides 15 thereof projecting beyond the channel 12 to engage the buck when the fastener is mounted thereon. The third member 16 of the fastener is U-shaped, fitting into the channel 14 of the member 13 with the sides and bottom of same in contact with the sides and bottom of the channel 14. The longitudinal edges of said members 16 are bent outwardly to form lips or flanges 17 which are spaced from the member 13.

The U-shaped channel constitutes a pocket for the bolts 9 and 28 by means of which the fastener is secured to the buck and the jamb and trim to the fasteners. The proper adjustment for the fasteners on the buck is obtained by means of washer 18 which can be straddled over the bolt 9 between the member 12 and buck, the desired number of washers being placed on the bolt before the fastener is brought into connection with the buck.

When trim and jamb are used in connection with fasteners the hinged side of the fastener (see Fig. 2) has the inner hollow portion 19 of less height than the outer hollow portion 20 to accommodate a filler 21 for the screws of the hinge 22, the filler being retained on the member 13 by the inwardly-directed side 23 of the molding or trim 24.

In cases where no molds are used the filler can be provided within the hollow 19, in which case the height of the hollow portions 19 and 20 will be the same. In addition the hinged side of the fasteners has an outwardly-directed bead or rib 25 reinforcing the member at the corner where the hinge is to be mounted. This rib also serves as a stop or bearing for the trim at the hinge 22.

The inwardly-directed sides 23 of the trims extend to engage the sides of the member 16 of the fastener. The edges of said sides are turned to form a longitudinal groove 26. The outwardly-turned parts of said sides contact with the lip 17 and extend out of same. The trims 24 have reinforcing plates 27 for engaging the threaded end of a rod 28 for which alining apertures are provided in the hollow portions of the fastener.

The ends of the rods projecting through the hollows into the channel 16 are threaded to receive a nut 29 to bind the trim and jamb to the fastener.

A door abutment 30 of channeled cross section has at the outer edge a molding 31 and an inwardly-directed lip 32 which is to engage the groove 26 of the outer trimming. It has also an inward lip 33 at the inner edge for engaging the groove 26 of the inner trimming. It will be noted that the lip 32 is wider than the lip 33, and the groove 26 on the outer trimming is deeper than the groove 26 on the inner trimming. This arrangement permits the engagement of the lip 32 with the groove 26, so as to allow the passing of the lip 33 over the outwardly-bent portion of the inner side 23 of the inner trimming. By forcing said door abutment in the direction of the arrow (see Fig. 2), the lip 33 is driven into the groove 26, the lip 32 of the abutment remaining in engagement with its groove 26. Thus the abutment is clipped or locked to the molding, thereby covering up the means connecting the fastener to the buck and the jamb and trim to the fastener. It will be noted that the engagement of the door abutment with the trimmings is helped by the movement of the door 34.

In cases where no trimmings are used, the lips 17 of the channeled member 16 will be arranged closer to the outer surface of the fastener 11 to form thereat grooves similar to those of 26, to permit the clipping of the door abutment in a manner previously described in connection with the trim.

From the above description it will be seen that all the connecting means which are used for assembling the hollow jamb and trimmings are concealed and the outer surfaces of the structures are smooth and uninterrupted.

I claim:

1. In combination, a buck, a hollow metal fastener having an inwardly-directed longitudinal channel, means for securing the fastener to the buck adapted to be accommodated within said channel, and a door abutment having means for engaging the fastener at the channel for rendering said channel invisible.

2. In combination, a buck, a hollow metal fastener having an inwardly-directed longitudinal channel, bolts carried by the fastener within the channel for securing the fastener to the buck, said fastener having longitudinal flanges at the channel, and a door abutment forming a cover for the channel having means for engaging the flanges of the fastener.

3. In combination, a buck, a hollow metal fastener having an inwardly-directed U-shaped channel, bolts in the channel for securing the fastener to the buck, said fastener adapted to engage with the sides thereof the sides of the buck when the fastener is secured to the buck by the bolts, said U-shaped channel of the fastener having outwardly directed flanges or lips at the edges thereof, and a door abutment forming a cover for said channel having means for engaging the flanges of the channel.

4. In combination with a buck, a hollow metal fastener having an inwardly-directed U-shaped longitudinal channel, bolts in the bottom of the channel for securing the fastener to the buck, a trim on each side of the fastener having inwardly-directed sides, bolts extending from the trim into the channel of the fastener for securing the trim to the fastener, the inwardly-directed sides of the trim having longitudinal grooves, and a door abutment having inwardly-directed flanges or lips for engaging the grooves of the trim whereby said door abutment constitutes a cover for the channel.

5. In combination, a buck, a hollow metal fastener having an inwardly-directed, U-shaped longitudinal channel, bolts in the bottom of said channel for engaging the buck whereby the fastener may be secured to the buck, said fastener adapted to engage with the sides thereof the sides of the buck when the fastener is secured to the buck, a trim on each side of the fastener, each of said trims having an inwardly-directed side terminating with a longitudinal groove at the edge thereof, bolts from the trim to the channel of the fastener whereby the trim is secured to the fastener, and a cover for the channel having means for engaging the grooves of the trim whereby the bolts within the channel are made invisible.

6. In combination, a buck, a hollow metal fastener having an inwardly-directed, U-shaped longitudinal channel, means for securing the channel to the buck located at the bottom of the channel, a trim on each side of the channel having a side extending inwardly toward the channel, said side having at the edges thereof outwardly-directed, U-shaped longitudinal grooves, means for securing the trim to the fastener adapted to engage the side of the channel, and a door abutment having inwardly-directed flanges for detachably engaging the grooves of the sides of the trims.

7. A hollow metal jamb comprising, a U-shaped channel member, a second U-shaped channel member having an inwardly-directed channel the bottom of which is adapted to contact with the inner surface of the first U-shaped channel, the sides of the second-mentioned U-shaped channel adapted to project beyond the outer surface of the first-mentioned channel, a third channel member fitting into the inwardly-directed channel of the second U-shaped channel member, said third channel member having outwardly-directed flanges at the edges thereof, and a cover for said channel adapted to be detachably secured to the flanges.

8. A hollow metal fastener comprising a U-shaped channel member, a second U- shaped channel member having an inwardly-directed U-shaped longitudinal channel the bottom of which is adapted to contact with the inner surface of the first-mentioned U-shaped channel, the sides of the second-mentioned U-shaped channel being adapted to project beyond said first-mentioned channel when the same is in contact with the inwardly-directed U-shaped channel of the second-mentioned channel, a third U-shaped channel fitting snugly into the inwardly-directed U-shaped channel of the second channel, said third channel having outwardly-directed flanges at the edges, and a door abutment having inwardly-directed flanges for engaging the flanges of the third channel and forming a cover for the third channel.

9. In combination, a buck of channeled cross section having elongated openings in its bottom, a hollow metal fastener having an inward longitudinal channel U shaped in cross section, said U-shaped channel having outwardly directed flanges at the edges thereof, a trim on each side of said channel having an inwardly-directed side extending to the inward channel, said sides of trims having outwardly-turned flanges at the edges thereof adapted to engage the flanges of the inward channel, said outwardly-turned flanges of the sides forming with said sides U-shaped grooves, bolts in the bottom of the inward channel for engaging the elongated openings of the buck, bolts from the trim to the inward channel for securing the trim to the fastener, and a door abutment having inwardly-directed longitudinal flanges for engaging the grooves whereby the abutment may be detachably secured to the sides and cover the inward channel.

10. In combination, a buck of channeled cross section having elongated openings in the bottom thereof, a fastener having an inwardly-directed longitudinal channel U shaped in cross section, bolts in the bottom of said inward channel for engaging the longitudinal openings in the buck whereby said fastener may be secured adjustably on the buck, a trim on each side of said fastener having an inwardly-directed side extending to the inward channel, said sides having outward, U-shaped grooves at the edges thereof, a filler between the inward side of the trim and the hinge side of the fastener for securing the door hinge thereto, bolts from the trims to the inward channel for securing the trims to the fastener, and a door abutment having inwardly-directed flanges for engaging the grooves in the sides of the trims and constituting a cover for the inward channel.

DANIEL PERIBONIS.

Copies of this patent may be obtained for five cents each, by addressing the "Commissioner of Patents, Washington, D. C."